(12) United States Patent
Feng

(10) Patent No.: US 11,550,561 B2
(45) Date of Patent: Jan. 10, 2023

(54) METHOD FOR UPGRADING ENERGY STORAGE SYSTEM REMOTELY, ENERGY MANAGEMENT SYSTEM, AND BATTERY MANAGEMENT SYSTEM

(71) Applicant: CONTEMPORARY AMPEREX TECHNOLOGY CO., LIMITED, Ningde (CN)

(72) Inventor: Yongyong Feng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/137,056

(22) Filed: Dec. 29, 2020

(65) Prior Publication Data
US 2021/0117180 A1 Apr. 22, 2021

Related U.S. Application Data

(63) Continuation of application No. PCT/CN2020/077702, filed on Mar. 4, 2020.

(30) Foreign Application Priority Data

Mar. 11, 2019 (CN) .......................... 201910181503.6

(51) Int. Cl.
*G06F 9/445* (2018.01)
*G06F 8/65* (2018.01)
(Continued)

(52) U.S. Cl.
CPC .................. *G06F 8/65* (2013.01); *G06F 1/28* (2013.01); *G06F 11/1433* (2013.01); *H02J 7/0029* (2013.01); *G06F 2201/865* (2013.01)

(58) Field of Classification Search
CPC .......... G06F 8/65; G06F 1/28; G06F 11/1433; G06F 2201/865; H02J 7/0029
(Continued)

(56) References Cited

U.S. PATENT DOCUMENTS 6,230,194 B1 5/2001 Frailong et al.
2015/0007155 A1* 1/2015 Hoffman ................... G06F 8/65
717/168

FOREIGN PATENT DOCUMENTS

CN 103337869 A 10/2013
CN 104590027 A 5/2015
(Continued)

OTHER PUBLICATIONS

Contemporary Amperex Technology Co. Limited, International Search Report and Written Opinion, PCTCN2020077702, dated May 28, 2020, 13 pgs.

(Continued)

*Primary Examiner* — Chuck O Kendall
(74) *Attorney, Agent, or Firm* — Morgan, Lewis & Bockius LLP

(57) ABSTRACT

This application discloses a method for upgrading an energy storage system, and an energy management system. The method includes: obtaining a to-be-upgraded file of the energy storage system; controlling the energy storage system to disconnect from high voltage when a current operating status of the energy storage system allows a program upgrade; detecting status of high voltage connection of the energy storage system; receiving a notification sent by a battery management system in the energy storage system indicating completion of disconnecting the energy storage system from the high voltage; and sending the to-be-upgraded file to the battery management system to perform the program upgrade according to the to-be-upgraded file.

16 Claims, 5 Drawing Sheets

(51) Int. Cl.
  *G06F 1/28*   (2006.01)
  *H02J 7/00*   (2006.01)
  *G06F 11/14*  (2006.01)

(58) Field of Classification Search
  USPC .......................................................... 717/124
  See application file for complete search history.

(56) References Cited

FOREIGN PATENT DOCUMENTS

| CN | 105491161 A | 4/2016 |
|---|---|---|
| CN | 105930236 A | 9/2016 |
| CN | 106254496 A | 12/2016 |
| CN | 106302761 A | 1/2017 |
| CN | 106873417 A | 6/2017 |
| CN | 107097667 A | 8/2017 |
| CN | 107222517 A | 9/2017 |
| CN | 107831442 A | 3/2018 |
| CN | 108874430 A | 11/2018 |
| CN | 109066926 A | 12/2018 |
| CN | 109408084 A | 3/2019 |

OTHER PUBLICATIONS

Contemporary Amperex Technology Co., Limited, Extended European Search Report, EP20769922.4, dated Aug. 31, 2021, 8 pgs.
Contemporary Amperex Technology Co., Limited, First Patent Search, CN201910181503, dated Sep. 13, 2021, 2 pgs.
Contemporary Amperex Technology Co., Limited, Supplementary Patent Search, CN201910181503, dated Sep. 13, 2021, 1 pg.
Ningder Age New Energy Technology Co. Ltd., First Office Action, CN201910181503.6, 26MAR2021, 36 pgs.
Ningder Age New Energy Technology Co. Ltd., Second Office Action, CN201910181503.6, 22JUN2021, 33 pgs.
Ningder Age New Energy Technology Co. Ltd., Notification to Grant Patent Right for Invention, CN2019I018 1503.6, 23SEP2021, 4 pgs.
Contemporary Amperex Technology Co., Limited, Communication Pursuant to Article 94(3), EP20768822.4, Oct. 18, 2022, 6 pgs.

* cited by examiner

METHOD FOR UPGRADING ENERGY STORAGE SYSTEM REMOTELY, ENERGY MANAGEMENT SYSTEM, AND BATTERY MANAGEMENT SYSTEM

CROSS-REFERENCE TO RELATED APPLICATIONS

This application is a continuation application of PCT Patent Application No. PCT/CN2020/077702, entitled "REMOTE UPGRADE METHOD FOR ENERGY STORAGE SYSTEM, AND ENERGY MANAGEMENT SYSTEM AND BATTERY MANAGEMENT SYSTEM" filed on Mar. 4, 2020, which claims priority to Chinese Patent Application No. 201910181503.6, filed with the State Intellectual Property Office of the People's Republic of China on Mar. 11, 2019, entitled "METHOD FOR UPGRADING ENERGY STORAGE SYSTEM REMOTELY, ENERGY MANAGEMENT SYSTEM, AND BATTERY MANAGEMENT SYSTEM", all of which are incorporated herein by reference in their entirety.

TECHNICAL FIELD

This application relates to the technical field of batteries, and in particular, to a method for upgrading an energy storage system remotely, an energy management system, and a battery management system.

BACKGROUND

A battery management system (hereinafter referred to as "BMS") is a link between a battery and a user, and can improve the utilization rate of the battery, prevent the battery from overcharge and overdischarge, extend the battery life, and monitor the battery status. However, once a program defect or version problem of the BMS occurs, it directly affects the service life of the battery, or even incurs serious consequences. Therefore, high requirements are imposed on software management of the BMS.

Currently, to upgrade a program of the BMS in the energy storage system, a host computer needs to establish physical communication with different nodes manually on site before the program upgrade. However, to perform a program upgrade for a large-scale energy storage station, such an upgrade method requires a lot of human resources and time, and requires the BMS to have an external interface reserved for upgrade, thereby failing to use the same line for both upgrade and communication, and increasing hardware costs.

SUMMARY

Embodiments of this application provide a method for upgrading an energy storage system remotely, an energy management system (EMS), and a BMS to implement remote program upgrade of the energy storage system, simplify upgrade operations of the energy storage system, and save costs of human resources and time. In addition, the same line can be shared by upgrade and communication, thereby saving hardware costs.

According to a first aspect, an embodiment of this application provides a method for upgrading an energy storage system. The energy storage system includes an EMS, a BMS, and a power conversion system (PCS). The method is applied to a computing device and includes: obtaining a to-be-upgraded file of the energy storage system; controlling, by the PCS, the energy storage system to disconnect from high voltage when a current operating status of the energy storage system allows a program upgrade, and detecting, by the BMS, status of high voltage connection of the energy storage system; receiving a notification sent by the BMS indicating completion of disconnecting the energy storage system from the high voltage; and sending the to-be-upgraded file to the BMS whereby the BMS performs the program upgrade to the energy storage system according to the to-be-upgraded file.

In a possible implementation, the obtaining a to-be-upgraded file of the energy storage system includes: receiving the to-be-upgraded file of the energy storage system sent by a server, wherein the server receives the to-be-upgraded file from a client, and the to-be-upgraded file is encrypted by the client after the client performs format adjustment; or querying the server for a version of the to-be-upgraded file in the server at a preset time or periodically, and obtaining an updated version of the to-be-upgraded file from the server if it is detected that the version of the to-be-upgraded file in the server is an updated version; or obtaining the to-be-upgraded file of the energy storage system from a memory connected to the EMS.

In a possible implementation, the sending the to-be-upgraded file to the BMS includes: detecting a type of a to-be-upgraded node in the to-be-upgraded file; obtaining, from the to-be-upgraded file, upgrade data corresponding to the type of the to-be-upgraded node; and sending the upgrade data corresponding to the type of the to-be-upgraded node to a communications gateway in the BMS, so that the communications gateway sends the upgrade data corresponding to the type of the to-be-upgraded node to a corresponding to-be-upgraded node to complete the program upgrade for the corresponding to-be-upgraded node.

According to a second aspect, an embodiment of this application provides a method for upgrading an energy storage system, applied to a computing device. The energy storage system includes an EMS, a BMS, and a PCS. The method includes: receiving, by a communications gateway in the BMS, a to-be-upgraded file sent by the EMS; controlling, by the PCS, the energy storage system to disconnect from high voltage when a current operating status of the energy storage system allows a program upgrade; detecting, by the BMS, status of high voltage connection of the energy storage system; sending the to-be-upgraded file to the BMS after receiving a notification sent by the BMS indicating completion of disconnecting the energy storage system from the high voltage; detecting a type of a to-be-upgraded node in the to-be-upgraded file; and performing the program upgrade on the to-be-upgraded node according to the type of the to-be-upgraded node by using the to-be-upgraded file.

In a possible implementation, the type of the to-be-upgraded node includes the communications gateway. The performing the program upgrade on the to-be-upgraded node according to the type of the to-be-upgraded node by using the to-be-upgraded file includes: setting an update flag bit in a non-volatile memory of the communications gateway; copying upgrade data in the to-be-upgraded file to a designated area of the communications gateway after an upgrade request included in the to-be-upgraded file to upgrade the communications gateway is detected; verifying the upgrade data in the designated area after completion of copying the upgrade data; and executing the upgrade data in the designated area of the communications gateway after verifying the upgrade data in the designated area, so as to complete the program upgrade of the communications gateway.

In a possible implementation, the type of the to-be-upgraded node includes a battery management unit and/or an insulation monitoring module (IMM) in the BMS. The performing the program upgrade on the to-be-upgraded node according to the type of the to-be-upgraded node by using the to-be-upgraded file includes: sending a program upgrade notification to the battery management unit and/or the IMM; obtaining upgrade data from the to-be-upgraded file after a program upgrade process of the battery management unit and/or the IMM is started, and sending the upgrade data to the battery management unit and/or the IMM, whereby the battery management unit and/or the IMM verifies the upgrade data and stores the upgrade data into a designated area in the battery management unit and/or the IMM after the upgrade data passes the verification, so as to complete the program upgrade of the battery management unit and/or the IMM.

In a possible implementation, the type of the to-be-upgraded node includes a cell supervision circuit (CSC) and/or a current sampling unit (CSU) in the BMS. The performing the program upgrade on the to-be-upgraded node according to the type of the to-be-upgraded node by using the to-be-upgraded file includes: sending a program upgrade notification to the CSC and/or the CSU; obtaining upgrade data from the to-be-upgraded file after a program upgrade process of the CSC and/or the CSU is started, and sending the upgrade data to the CSC and/or the CSU through a battery management unit, so that the CSC and/or the CSU verifies the upgrade data and stores the upgrade data into a designated area in the CSC and/or the CSU after the upgrade data passes the verification, so as to complete the program upgrade for the CSC and/or the CSU.

In a possible implementation, the method further includes: correcting, by the communications gateway, an error according to an error type of the error if the error occurs in the program upgrade process; and restarting to perform a new process of program upgrade if the error fails to be corrected, stopping the program upgrade process when a cumulative quantity of restarts of the same upgrade data exceeds a preset threshold, and reporting a program upgrade failure notification to the EMS.

In a possible implementation, the type of the to-be-upgraded node includes a battery management unit, an IMM, and/or a CSU in the BMS. The to-be-upgraded file includes a preset threshold and/or a preset parameter of the BMS. The performing the program upgrade on the to-be-upgraded node according to the type of the to-be-upgraded node by using the to-be-upgraded file includes: parsing the to-be-upgraded file to obtain the threshold and/or parameter of the BMS included in the to-be-upgraded file; and sending the threshold and/or parameter of the BMS to a corresponding to-be-upgraded node in the BMS when it is detected that the current operating status of the BMS allows upgrading.

According to a third aspect, an embodiment of this application further provides an EMS, disposed in an energy storage system. The EMS includes a receiver, a transmitter, a memory, a processor, and a plurality of computer programs stored in the memory and adaptable for being executed by the processor. The processor is configured to: obtain a to-be-upgraded file of the energy storage system; control, by using a PCS in the energy storage system, the energy storage system to disconnect from high voltage when a current operating status of the energy storage system allows a program upgrade; detect status of high voltage connection of the energy storage system by using the BMS; receive, by using a receiver, a notification sent by the BMS indicating completion of disconnecting the energy storage system from the high voltage; and send, by using the transmitter, the to-be-upgraded file to the BMS so that the BMS performs the program upgrade to the energy storage system according to the to-be-upgraded file.

In a possible implementation, that the processor is specifically configured to: receive, by using the receiver, the to-be-upgraded file of the energy storage system sent by a server, where the server receives the to-be-upgraded file from a client, and the to-be-upgraded file is encrypted by the client after the client performs format adjustment; or the processor is specifically configured to: query the server for a version of the to-be-upgraded file in the server at a preset time or periodically, and obtain an updated version of the to-be-upgraded file from the server if it is detected that the version of the to-be-upgraded file in the server is an updated version; or the processor is specifically configured to: obtain the to-be-upgraded file of the energy storage system from a memory connected to the EMS.

In a possible implementation, the processor is further configured to: detect a type of a to-be-upgraded node in the to-be-upgraded file; and obtain, from the to-be-upgraded file, upgrade data corresponding to the type of the to-be-upgraded node. The processor is further configured to: send, by using the transmitter, the upgrade data corresponding to the type of the to-be-upgraded node to a communications gateway in the BMS, so that the communications gateway sends the upgrade data corresponding to the type of the to-be-upgraded node to a corresponding to-be-upgraded node to complete the program upgrade for the corresponding to-be-upgraded node.

According to a fourth aspect, an embodiment of this application further provides a BMS, disposed in an energy storage system. The BMS includes a communications gateway. The communications gateway is configured to: receive a to-be-upgraded file sent by the EMS, where the to-be-upgraded file is obtained by the EMS; control, by the EMS by using the PCS, the energy storage system to disconnect from high voltage when a current operating status of the energy storage system allows a program upgrade, and detect status of high voltage connection of the energy storage system by using the BMS; send the to-be-upgraded file to the BMS after receiving a notification sent by the BMS indicating completion of disconnecting the energy storage system from the high voltage; detect a type of a to-be-upgraded node in the to-be-upgraded file; and perform the program upgrade on the to-be-upgraded node according to the type of the to-be-upgraded node by using the to-be-upgraded file.

In a possible implementation, the communications gateway is specifically configured to: set an update flag bit in a non-volatile memory of the communications gateway when the type of the to-be-upgraded node is the communications gateway; copy upgrade data in the to-be-upgraded file to a designated area of the communications gateway after an upgrade request included in the to-be-upgraded file to upgrade the communications gateway is detected; verify the upgrade data in the designated area after completion of copying the upgrade data; and execute the upgrade data in the designated area of the communications gateway after verifying the upgrade data in the designated area, so as to complete the program upgrade for the communications gateway.

In a possible implementation, the BMS further includes a battery management unit and/or an IMM. The communications gateway is further configured to: send a program upgrade notification to the battery management unit and/or the IMM; obtain upgrade data from the to-be-upgraded file after a program upgrade process of the battery management unit and/or the IMM is started, and send the upgrade data to the battery management unit and/or the IMM. The battery management unit and/or the IMM is configured to verify the upgrade data and store the upgrade data into a designated area in the battery management unit and/or the IMM after the upgrade data passes the verification, so as to complete the program upgrade of the battery management unit and/or the IMM.

In a possible implementation, the BMS further includes a CSC and/or a CSU. The communications gateway is further configured to: send a program upgrade notification to the CSC and/or the CSU; obtain upgrade data from the to-be-upgraded file after a program upgrade process of the CSC and/or the CSU is started, and send the upgrade data to the CSC and/or the CSU through a battery management unit. The CSC and/or the CSU is configured to verify the upgrade data and store the upgrade data into a designated area in the CSC and/or the CSU after the upgrade data passes the verification, so as to complete the program upgrade for the CSC and/or the CSU.

In a possible implementation, the communications gateway is further configured to: correct an error according to an error type of the error when the error occurs in the program upgrade process; and restart to perform a new process of program upgrade if the error fails to be corrected, stop the program upgrade process when a cumulative quantity of restarts of the same upgrade data exceeds a preset threshold, and report a program upgrade failure notification to the EMS.

In a possible implementation, the type of the to-be-upgraded node includes a battery management unit, an IMM, and/or a CSU in the BMS. The to-be-upgraded file includes a preset threshold and/or a preset parameter of the BMS. The communications gateway is specifically configured to parse the to-be-upgraded file to obtain the threshold and/or parameter of the BMS included in the to-be-upgraded file; and send the threshold and/or parameter of the BMS to a corresponding to-be-upgraded node in the BMS when it is detected that the current operating status of the BMS allows upgrading.

According to a fifth aspect, an embodiment of this application further provides a PCS, the EMS described above, and the BMS described above. The EMS is connected to the PCS, the PCS is connected to the BMS, and the EMS is connected to the BMS.

According to a sixth aspect, an embodiment of this application further provides a communications gateway, disposed in a BMS. The communications gateway includes a receiver, a memory, a processor, and a computer program stored in the memory and adaptable for running on the processor. The processor implements the method according to the second aspect when executing the computer program.

According to a seventh aspect, an embodiment of this application further provides a remote upgrade system for an energy storage system, including: a client, a server, and the energy storage system described above.

According to an eighth aspect, an embodiment of this application further provides a non-transitory computer-readable storage medium on which a computer program is stored. When executed by a processor, the computer program implements the method according to the first aspect.

According to a ninth aspect, an embodiment of this application further provides a non-transitory computer-readable storage medium on which a computer program is stored. When executed by a processor, the computer program implements the method according to the second aspect.

The foregoing technical solutions are applied to an energy storage system. The energy storage system includes an EMS, a BMS, and PCS. After the to-be-upgraded file of the energy storage system is obtained, when the current operating status of the energy storage system allows a program upgrade, the EMS controls, by using the PCS, the energy storage system to disconnect from high voltage; detects the status of high voltage connection of the energy storage system by using the BMS; and sends the to-be-upgraded file to the BMS after receiving the notification sent by the BMS indicating completion of disconnecting the energy storage system from the high voltage, so that the BMS performs the program upgrade according to the to-be-upgraded file. In this way, the program upgrade can be performed for the energy storage system remotely, the upgrade operation of the energy storage system is simplified, and costs of human resources and time are saved. In addition, the same line can be shared by upgrade and communication, thereby further saving hardware costs.

DESCRIPTION OF DRAWINGS

To describe the technical solutions in the embodiments of this application more clearly, the following outlines the accompanying drawings used in the embodiments. Apparently, the accompanying drawings outlined below are only a part of embodiments of this application. A person of ordinary skill in the art may derive other drawings from these accompanying drawings without making any creative efforts.

DESCRIPTION OF EMBODIMENTS

For better understanding of the technical solutions of this application, the following describes embodiments of this application in detail with reference to accompanying drawings.

It is apparent that the described embodiments are only a part rather than an entirety of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precede a singular noun in the embodiments and claims of this application are intended to include the plural form thereof.

Figure 1:
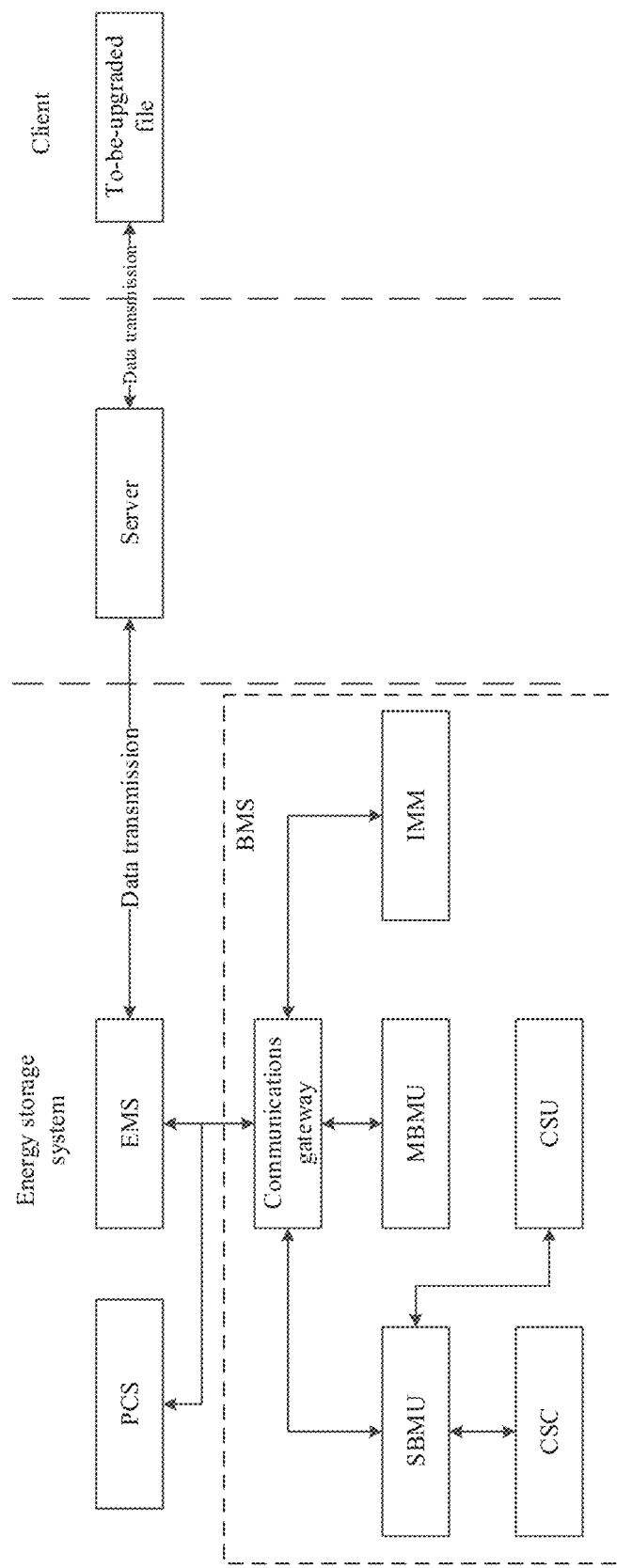
FIG. 1 is a schematic diagram of a communications architecture of an energy storage system according to this application.

FIG. 1 is a schematic diagram of a communications architecture of an energy storage system according to this application. As shown in FIG. 1, the communications architecture of the energy storage system includes a client, a server, and an energy storage system. The communication means for remote communication between the client and the energy storage system may be, but without limitation, Ethernet. Nevertheless, other communications means available for remote communication may also be included. The communication means between different energy storage systems may be, but without limitation, a wireless network or a controller area network (hereinafter referred to as "CAN"). Nevertheless, other communication means may also be adopted.

In the embodiments of this application, circumstances in which an energy storage system is upgraded remotely may include the following circumstances:

1. Program upgrade: with development of the BMS and accumulation of experience, software policies are improved by being revised continuously. Some functions that are not achieved at first will be achieved gradually, thereby making it necessary to normally upgrade devices that have been delivered at the client. Remote upgrading enables a remote program upgrade for the energy storage system at the client without requiring on-site presence of after-sales personnel.

2. Software bug fixing: when a software bug appears, the bug needs to be fixed, and a program of the energy storage system needs to be upgraded remotely.

3. Modification of a threshold and/or parameter of the energy storage system, including the following circumstances:

1) Aging curve of a battery cell: when a battery cell is in use over time, an original preset aging curve of the battery cell may deviate from actual situations, and the aging curve of the battery cell needs to be calibrated.

2) Open circuit voltage (hereinafter referred to as "OCV") curve of the battery cell: with the aging of the battery cell, an original OCV curve of the battery cell deviates from actual situations, thereby affecting calculation of a state of charge (hereinafter referred to as "SOC") in the system;

3) Charge and discharge form and power form: with the aging of the battery cell, original parameters of the battery cell will change. If the battery cell is further charged and discharged at a high current rate, the life of the battery cell will be shortened quickly. Therefore, the charge and discharge form and the power form in the system need to be updated.

4) Protection functions of the energy storage system are greatly affected by working conditions. Alarm thresholds in the system, such as battery cell overvoltage/undervoltage threshold, insulation alarm threshold, and temperature alarm threshold, need to be set according to actual working conditions and situations on different customer sites.

Figure 2:
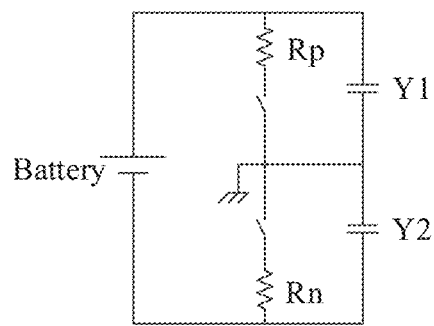
FIG. 2 is a schematic diagram of an embodiment of an insulation monitoring circuit according to this application.

5) Hardware aging parameters: Physical characteristics of hardware devices, such as a Y capacitor commonly used in the energy storage system, will change over time during use. Referring to FIG. 2, FIG. 2 is a schematic diagram of an embodiment of an insulation monitoring circuit according to this application. Generally, capacitance values of Y1 and Y2 increase gradually over time during use. This affects an insulation sampling precision of the energy storage system, and erroneous insulation sampling values lead to personal safety hazards. Therefore, the Y capacitor needs to be inspected regularly to check for any change, and a delay period of switching a switch in the insulation sampling needs to be corrected to ensure correct insulation sampling.

Figure 3:
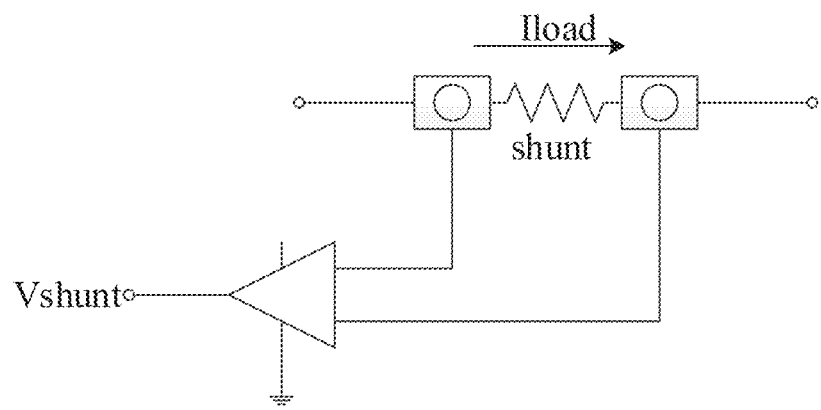
FIG. 3 is a schematic diagram of an embodiment of a current sampling path according to this application.

6) Resistance value of a shunt resistor (hereinafter referred to as "shunt"): Referring to FIG. 3, FIG. 3 is a schematic diagram of an embodiment of a current sampling path according to this application. Currently, currents are sampled in the energy storage system mainly by a shunt. The resistance value of the shunt changes with time and temperature, thereby affecting the precision of current sampling. Because a CSU is incapable of timing, the preset shunt resistance value needs to be corrected by a manufacturer according to usage time and temperature.

To upgrade a program of the energy storage system remotely under the above circumstances, an embodiment of this application discloses a method for upgrading an energy storage system remotely. The method is applied to an energy storage system. Referring to FIG. 1, the energy storage system may include an EMS, a BMS, and a PCS.

Figure 4:
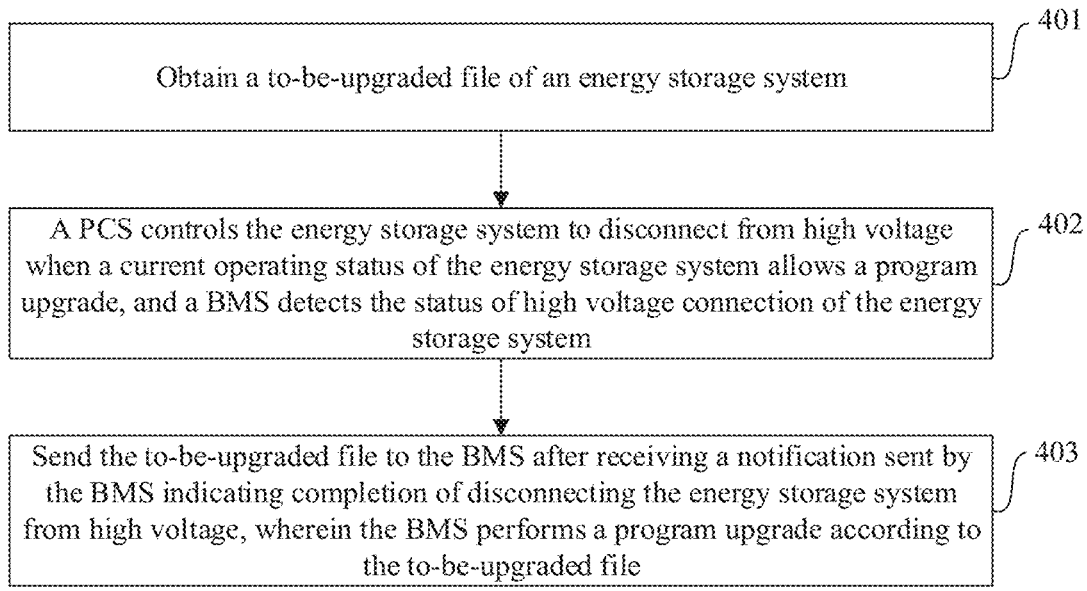
FIG. 4 is a flowchart of an embodiment of a method for upgrading an energy storage system remotely according to this application.

FIG. 4 is a flowchart of an embodiment of the method for upgrading an energy storage system remotely according to this application. The method for upgrading an energy storage system remotely according to this embodiment may be implemented by the EMS. As shown in FIG. 4, the method for upgrading an energy storage system remotely may include the following steps.

Step 401: Obtain a to-be-upgraded file of the energy storage system.

Specifically, the obtaining a to-be-upgraded file of the energy storage system may be: receiving the to-be-upgraded file of the energy storage system sent by a server, wherein the server receives the to-be-upgraded file from a client, and the to-be-upgraded file is encrypted by the client after the client performs format adjustment; or querying the server for a version of the to-be-upgraded file in the server at a preset time or periodically, and obtaining an updated version of the to-be-upgraded file from the server if it is detected that the version of the to-be-upgraded file in the server is an updated version; or obtaining the to-be-upgraded file of the energy storage system from a memory connected to the EMS.

In other words, in an implementation, referring to the communications architecture of the energy storage system shown in FIG. 1, after performing format adjustment and/or data encryption on the to-be-upgraded file of the energy storage system, the client uploads the encrypted file to the server through a network. After detecting the to-be-upgraded file uploaded by the client, the server notifies the EMS that a file needs to be upgraded, and sends the to-be-upgraded file to the EMS.

In another implementation, the EMS may query the server for a version of the to-be-upgraded file in the server at a preset time or periodically, and obtain an updated version of the to-be-upgraded file from the server if it is detected that the version of the to-be-upgraded file in the server is an updated version.

In addition, in still another implementation, the EMS may also obtain the to-be-upgraded file of the energy storage system from the memory connected to the EMS. Specifically, the to-be-upgraded file of the energy storage system may be stored in the memory, and then the memory is connected to the EMS. In this way, the EMS can obtain the to-be-upgraded file of the energy storage system from the connected memory. The memory may be a device capable of storage, such as a USB flash disk or a mobile hard disk. This embodiment does not limit the form of the memory.

Step 402: The PCS controls the energy storage system to disconnect from high voltage when a current operating status of the energy storage system allows a program upgrade, and the BMS detects the status of high voltage connection of the energy storage system.

Specifically, after obtaining the to-be-upgraded file, the EMS needs to determine whether the current operating status of the energy storage system allows a program upgrade. If the energy storage system is currently in a working state such as a high-power output state, the program upgrade is not allowed. If the energy storage system is currently in a non-working state such as a static standing state, the program upgrade is allowed. When the current operating status of the energy storage system allows the program upgrade, the EMS controls, by using the PCS, the energy storage system to disconnect from high voltage, and detects the status of high voltage connection of the energy storage system by using the BMS.

Step 403: Send the to-be-upgraded file to the BMS after receiving a notification sent by the BMS indicating completion of disconnecting the energy storage system from the high voltage, so that the BMS performs the program upgrade according to the to-be-upgraded file.

Specifically, the BMS detects the status of high voltage disconnection of the energy storage system and, if it is detected that the energy storage system is disconnected from high voltage, sends a notification to the EMS indicating completion of disconnecting the energy storage system from the high voltage. After receiving the notification sent by the BMS indicating completion of disconnecting the energy storage system from the high voltage, the EMS may send the to-be-upgraded file to the BMS according to an established communications protocol, so that the BMS performs the program upgrade according to the to-be-upgraded file.

In an implementation, the sending the to-be-upgraded file to the BMS so that the BMS performs the program upgrade according to the to-be-upgraded file may be: detecting a type of a to-be-upgraded node in the to-be-upgraded file; obtaining, from the to-be-upgraded file, upgrade data corresponding to the type of the to-be-upgraded node, and sending the upgrade data corresponding to the type of the to-be-upgraded node to a communications gateway in the BMS, so that the communications gateway sends the upgrade data corresponding to the type of the to-be-upgraded node to a corresponding to-be-upgraded node to complete the program upgrade for the corresponding to-be-upgraded node.

In other words, after obtaining the to-be-upgraded file, the EMS may parse the to-be-upgraded file, detect the type of the to-be-upgraded node in the to-be-upgraded file, split the to-be-upgraded file, and obtain, from the to-be-upgraded file, the upgrade data corresponding to the type of the to-be-upgraded node; finally, send the obtained upgrade data to the communications gateway in the BMS, so that the communications gateway sends the upgrade data to the corresponding to-be-upgraded node to complete the program upgrade for the corresponding to-be-upgraded node.

In the method for upgrading an energy storage system remotely, after the to-be-upgraded file of the energy storage system is obtained, when the current operating status of the energy storage system allows a program upgrade, the EMS controls, by using the PCS, the energy storage system to disconnect from high voltage; detects the status of high voltage connection of the energy storage system by using the BMS; and sends the to-be-upgraded file to the BMS after receiving the notification sent by the BMS indicating completion of disconnecting the energy storage system from the high voltage, so that the BMS performs the program upgrade according to the to-be-upgraded file. In this way, the program upgrade can be performed for the energy storage system remotely, the upgrade operation of the energy storage system is simplified, and costs of human resources and time are saved. In addition, the same line can be shared by upgrade and communication, thereby further saving hardware costs.

Figure 5:
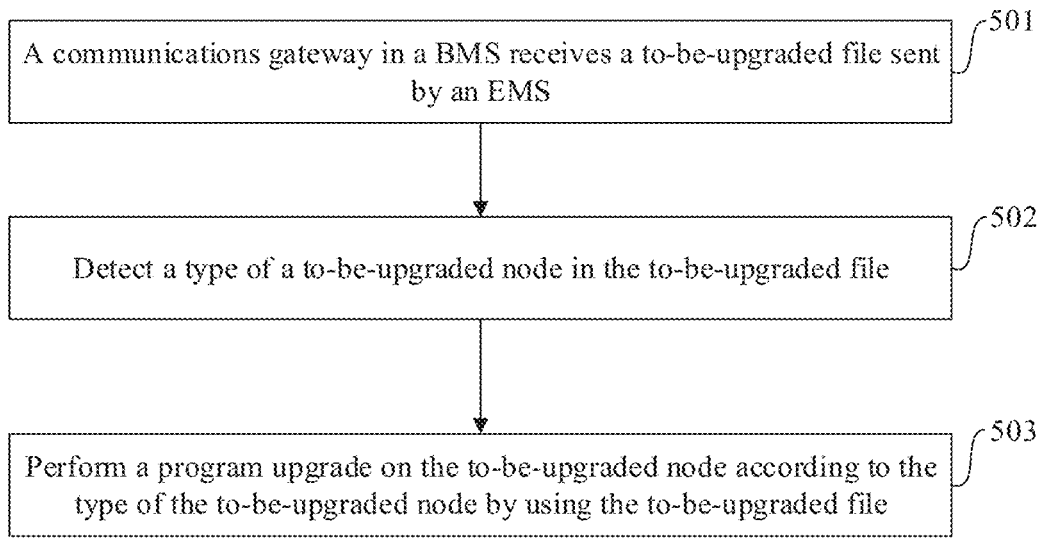
FIG. 5 is a flowchart of another embodiment of a method for upgrading an energy storage system remotely according to this application.

FIG. 5 is a flowchart of another embodiment of a method for upgrading an energy storage system remotely according to this application. The method for upgrading an energy storage system remotely according to this embodiment may be implemented by a BMS. As shown in FIG. 5, the method for upgrading an energy storage system remotely may include the following steps.

Step 501: A communications gateway in the BMS receives a to-be-upgraded file sent by an EMS.

The to-be-upgraded file is obtained by the EMS. By using the PCS, the EMS controls the energy storage system to disconnect from high voltage when a current operating status of the energy storage system allows a program upgrade, and detects status of high voltage connection of the energy storage system by using the BMS. The EMS sends the to-be-upgraded file to the BMS after receiving a notification sent by the BMS indicating completion of disconnecting the energy storage system from the high voltage.

Step 502: Detect a type of a to-be-upgraded node in the to-be-upgraded file.

Specifically, after receiving the to-be-upgraded file sent by the EMS, the communications gateway in the BMS may perform one or more of the following operations on the received to-be-upgraded file: decryption, decompression, verification, and storage.

The verification may include an integrity check. Nevertheless, this embodiment is not limited to the integrity check. The verification may also include other types of checks, such as a legality check. This embodiment does not limit the type of the verification.

After performing the above operations on the received to-be-upgraded file, the communications gateway may detect the type of the to-be-upgraded node in the to-be-upgraded file.

Step 503: Perform the program upgrade on the to-be-upgraded node according to the type of the to-be-upgraded node by using the to-be-upgraded file.

In this embodiment, the type of the to-be-upgraded node is indicated in the to-be-upgraded file. The upgrade mode varies with the type of the to-be-upgraded node.

In a specific implementation, the type of the to-be-upgraded node may be a communications gateway. In this case, the performing the program upgrade on the to-be-upgraded node according to the type of the to-be-upgraded node by using the to-be-upgraded file may be: setting an update flag bit in a non-volatile memory of the communications gateway; after an upgrade request included in the to-be-upgraded file to upgrade the communications gateway is detected, copying upgrade data in the to-be-upgraded file to a designated area of the communications gateway, such as an application (hereinafter referred to as "APP") running area in the communications gateway; verifying the upgrade data in the designated area after completion of copying the upgrade data; and executing the upgrade data in the designated area of the communications gateway after verifying the upgrade data in the designated area, so as to complete the program upgrade of the communications gateway.

Specifically, after the communications gateway detects the type of the to-be-upgraded node in the to-be-upgraded file, if the type of the to-be-upgraded node is the communications gateway itself, the communications gateway may set an update flag bit in a non-volatile memory (hereinafter referred to as "NVM"), and then start a program upgrade process (that is, jump to run a boot program). The boot program detects that an upgrade request exists currently, and therefore, copies the upgrade data, which is stored in a backup area of the communications gateway, to a designated area (such as an APP running area) of the communications gateway in an established file format. The boot program verifies the data in the designated area after completion of copying the upgrade data. After the upgrade data passes the verification, the resetting application is verified valid, and the upgrade data is run in the designated area of the communications gateway, so as to complete the program upgrade for the communications gateway.

In another implementation, the type of the to-be-upgraded node may include a battery management unit and/or an IMM in the BMS. The battery management unit in the BMS may include: a slave battery management unit (hereinafter referred to as "SBMU") and a master battery management unit (hereinafter referred to as "MBMU"). In this case, the performing the program upgrade on the to-be-upgraded node according to the type of the to-be-upgraded node by using the to-be-upgraded file may be:

sending a program update notification to the battery management unit and/or the IMM; obtaining upgrade data from the to-be-upgraded file after a program upgrade process of the battery management unit and/or the IMM is started, and sending the upgrade data to the battery management unit and/or the IMM, so that the battery management unit and/or the IMM verifies the upgrade data and stores the upgrade data into a designated area in the battery management unit and/or the IMM after the upgrade data passes the verification, so as to complete the program upgrade for the battery management unit and/or the IMM.

Specifically, if the communications gateway detects that the type of the to-be-upgraded node is SBMU, MBMU, or IMM, firstly the communications gateway instructs the SBMU, MBMU, or IMM to upgrade the program, and the SBMU, MBMU, or IMM jumps to run a boot program to start a program upgrade process. Secondly, the communications gateway may directly send the upgrade data, which is obtained from the to-be-upgraded file, to the SBMU, MBMU, or IMM according to an established upgrade policy and in an established communications format. The boot program of the SBMU, MBMU, or IMM verifies the received upgrade data and, after the upgrade data passes the verification, stores the upgrade data into a designated area to complete the program upgrade for the SBMU, MBMU, or IMM.

In still another implementation, the type of the to-be-upgraded node may be a CSC and/or a CSU in the BMS. In this case, the performing the program upgrade on the to-be-upgraded node according to the type of the to-be-upgraded node by using the to-be-upgraded file may be: sending a program upgrade notification to the CSC and/or the CSU; obtaining upgrade data from the to-be-upgraded file after a program upgrade process of the CSC and/or the CSU is started, and sending the upgrade data to the CSC and/or the CSU through a battery management unit, so that the CSC and/or the CSU verifies the upgrade data and stores the upgrade data into a designated area in the CSC and/or the CSU after the upgrade data passes the verification, so as to complete the program upgrade for the CSC and/or the CSU.

Specifically, if the communications gateway detects that the type of the to-be-upgraded node is CSC or CSU, firstly the communications gateway instructs the CSC or CSU to upgrade the program, and the CSC or CSU jumps to run a boot program to start a program upgrade process. Secondly, the communications gateway sends the upgrade data, which is obtained from the to-be-upgraded file, to the SBMU according to an established upgrade policy and in an established communications format. The SBMU forwards the upgrade data to the CSC or CSU. The boot program of the CSC or CSU verifies the received upgrade data and, after the upgrade data passes the verification, stores the upgrade data into a designated area in the CSC or CSU to complete the program upgrade for the CSC or CSU.

Further, if any error occurs in the program upgrade process of the SBMU, MBMU, IMM, CSC, and/or CSU, the communications gateway corrects the error according to an error type of the error, and restarts to perform a new process of program upgrade if the error fails to be corrected. When a cumulative quantity of restarts of the same upgrade data exceeds a preset threshold, the communications gateway stops the program upgrade process and reports a program upgrade failure notification to the EMS.

Specifically, for the error that occurs in the program upgrade process, the communications gateway may correct the error by means of packet retransmission.

The preset threshold of the quantity of restarts may be set according to system performance and/or implementation requirements and the like in a specific implementation. This embodiment does not limit the threshold. For example, the threshold may be 5.

In still another implementation of this embodiment, the type of the to-be-upgraded node may include a battery management unit, an IMM, and/or a CSU in the BMS. The to-be-upgraded file includes a preset threshold and/or a preset parameter of the BMS. In this case, the performing the program upgrade on the to-be-upgraded node according to the type of the to-be-upgraded node by using the to-be-upgraded file may be: parsing the to-be-upgraded file to obtain the threshold and/or parameter of the BMS included in the to-be-upgraded file; and sending the threshold and/or parameter of the BMS to a corresponding to-be-upgraded node in the BMS when it is detected that the current operating status of the BMS allows upgrading, for example, when it is detected that the BMS is in a static standing state.

The following describes in detail a process of remotely updating a threshold and/or parameter of the BMS.

1. Aging of a battery cell leads to change of a cell aging curve, a cell OCV curve, a charge and discharge form, and a power form. Therefore, a corrected parameter may be input into a specified position in a file in an established format at the client.

2. Due to different working conditions and customer requirements, in order to reduce required human resources for debugging and maintenance, the threshold of the energy storage system needs to be able to be set when the system is operating. Parameters of all energy storage systems are set to default values at delivery from the manufacturer. After the energy system is installed on site, appropriate system thresholds and parameters may be set at the client according to the working conditions of the energy storage system, customer requirements, and equipment performance. The thresholds that need to be set may include: overvoltage/undervoltage alarm threshold of a battery cell, insulation alarm threshold, and undertemperature/overtemperature alarm threshold of a battery cell or pack. In a specific implementation, the reset thresholds and parameters may be input into specified positions in a file in an established format at the client.

3. Referring to FIG. 2, resistance values measured in the insulation detection may jump sharply or may be too low due to the change of the Y capacitor in the energy storage system. Therefore, the delay period of switching a switch during the insulation detection of the IMM board may be modified remotely to determine whether a current abnormal value of insulation sampling is caused by the change of the Y capacitor. A specific determining method is: if the insulation resistance stops jumping after the delay period of the switch is increased (for example, the delay period is set to 1 second and reset to 2 seconds), it indicates that the change of the Y capacitor affects the insulation detection, and the delay parameter may be adjusted remotely until an appropriate delay period is reached. If the insulation value is still low after the delay period of the switch is increased, it indicates that an insulation value of the system is inherently low, and the low value has nothing to do with the change of the Y capacitor. In a specific implementation, the reset delay period may also be input into a specified position in the file in an established format at the client.

4. As shown in FIG. 3, for the shunt in the CSU, it is known that the resistance of the shunt changes with time and temperature, and the manufacturer of the shunt provides a table of resistance values changing with time. However, because the CSU is incapable of timing, the corrected shunt resistance value may be input into a specified position in the file in an established format at the client according to a service age.

5. A file in an established format generated under one or more of the above circumstances is used as a to-be-upgraded file. The to-be-upgraded file is encrypted and sent to the server. The server sends the to-be-upgraded file to the EMS. Then the EMS sends the to-be-upgraded file to the communications gateway in the BMS. The communications gateway in the BMS decrypts, verifies and stores the to-be-upgraded file. When it is detected that the BMS is in a static standing state, the communications gateway sends, in an established communication mode, the threshold and/or parameter of the BMS included in the to-be-upgraded file to the corresponding to-be-upgraded node in the BMS.

Wherein, the established communication mode adopted by the communications gateway may be a unified diagnostic service (hereinafter referred to as "UDS"), but is not limited to UDS, and may also be other communications modes, without being limited in this embodiment.

In addition, in this embodiment, a comparison table of threshold and parameter update of the to-be-upgraded node may be shown in Table 1.

TABLE 1

| Type of node | Corresponding data address allocated in the file | Data field size |
| --- | --- | --- |
| MBMU | 0~255 | 256 bytes |
| SBMU | 256~511 | 256 bytes |
| IMM | 512~543 | 32 bytes |
| CSC | 544~575 | 32 bytes |
| CSU | 575~606 | 32 bytes |

In the method for upgrading an energy storage system remotely, the communications gateway in the BMS receives the to-be-upgraded file sent by the EMS, detects the type of the to-be-upgraded node in the to-be-upgraded file, and performs the program upgrade on the to-be-upgraded node according to the type of the to-be-upgraded node by using the to-be-upgraded file. The to-be-upgraded file sent by the EMS is obtained by the EMS, and therefore, when the current operating status of the energy storage system allows a program upgrade, the EMS controls, by using the PCS, the energy storage system to disconnect from high voltage, and detects the status of high voltage connection of the energy storage system by using the BMS. After receiving the notification sent by the BMS indicating completion of disconnecting the energy storage system from the high voltage, the EMS sends the to-be-upgraded file to the BMS. In this way, the program upgrade can be performed for the energy storage system remotely, the upgrade operation of the energy storage system is simplified, and costs of human resources and time are saved. In addition, the same line can be shared by upgrade and communication, thereby further saving hardware costs.

In addition, in this embodiment of this application, referring to the communications architecture of the energy storage system shown in FIG. 1, the client may also periodically download operating data of the energy storage system from the server, and analyze the operating status of the energy storage system. In this way, the client can be built in a town far away from the energy storage system, and the operating status of the energy storage system can be monitored remotely in real time.

Figure 6:
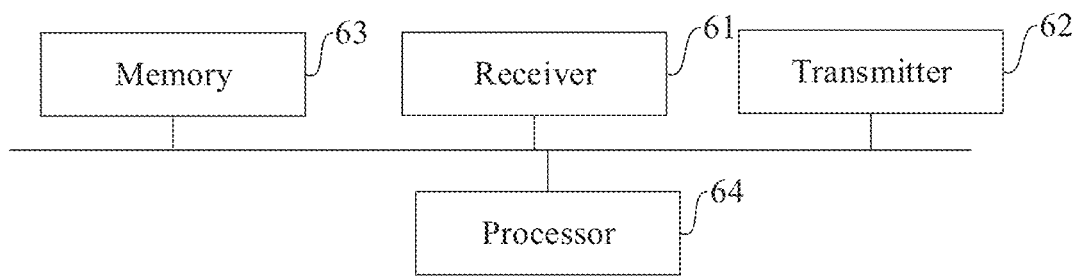
FIG. 6 is a schematic structural diagram of an embodiment of an EMS according to this application.

FIG. 6 is a schematic structural diagram of an embodiment of an EMS according to this application. The EMS is disposed in the energy storage system. As shown in FIG. 6, the EMS includes a receiver 61, a transmitter 62, a memory 63, a processor 64, and a computer program stored in the memory 63 and adaptable for running on the processor 64.

The processor 64 is configured to: execute the computer program to obtain a to-be-upgraded file of the energy storage system; control, by using a PCS in the energy storage system, the energy storage system to disconnect from high voltage when a current operating status of the energy storage system allows a program upgrade; and detect status of high voltage connection of the energy storage system by using the BMS.

That the processor 64 is configured to obtain a to-be-upgraded file of the energy storage system may be: the processor 64 is specifically configured to: receive the to-be-upgraded file of the energy storage system sent by a server, where the to-be-upgraded file of the energy storage system is sent by the server after the to-be-upgraded file uploaded by a client is received, and the to-be-upgraded file uploaded by a client is an encrypted to-be-upgraded file that is uploaded by the client to the server after the client performs format adjustment and/or data encryption on the to-be-upgraded file of the energy storage system; or, the processor 64 is specifically configured to: query the server for a version of the to-be-upgraded file in the server at a preset time or periodically, and obtain an updated version of the to-be-upgraded file from the server if it is detected that the version of the to-be-upgraded file in the server is an updated version; or obtain the to-be-upgraded file of the energy storage system from a memory connected to the EMS.

In other words, in an implementation, referring to the communications architecture of the energy storage system shown in FIG. 1, after performing format adjustment and/or data encryption on the to-be-upgraded file of the energy storage system, the client uploads the encrypted file to the server through a network. After detecting the to-be-upgraded file uploaded by the client, the server notifies the EMS that a file needs to be upgraded, and sends the to-be-upgraded file to the EMS.

In another implementation, the processor 64 may query the server for a version of the to-be-upgraded file in the server at a preset time or periodically, and obtain an updated version of the to-be-upgraded file from the server if it is detected that the version of the to-be-upgraded file in the server is an updated version.

In addition, in still another implementation, the processor 64 may also obtain the to-be-upgraded file of the energy storage system from the memory connected to the EMS. Specifically, the to-be-upgraded file of the energy storage system may be stored in the memory, and then the memory is connected to the EMS. In this way, the processor 64 can obtain the to-be-upgraded file of the energy storage system from the connected memory. The memory may be a device capable of storage, such as a USB flash disk or a mobile hard disk. This embodiment does not limit the form of the memory.

The receiver 61 is configured to receive a notification sent by the BMS indicating completion of disconnecting the energy storage system from the high voltage.

The transmitter 62 is configured to send the to-be-upgraded file to the BMS so that the BMS performs the program upgrade according to the to-be-upgraded file.

Specifically, the BMS detects the status of high voltage disconnection of the energy storage system and, if it is detected that the energy storage system is disconnected from high voltage, sends a notification to the EMS indicating completion of disconnecting the energy storage system from the high voltage. After the receiver 61 receives the notification sent by the BMS indicating completion of disconnecting the energy storage system from the high voltage, the transmitter 62 may send the to-be-upgraded file to the BMS according to an established communications protocol, so that the BMS performs the program upgrade according to the to-be-upgraded file.

In an implementation, the processor 64 is further configured to: detect a type of a to-be-upgraded node in the to-be-upgraded file; and obtain, from the to-be-upgraded file, upgrade data corresponding to the type of the to-be-upgraded node. In this case, the transmitter 62 is specifically configured to send the upgrade data corresponding to the type of the to-be-upgraded node to a communications gateway in the BMS, so that the communications gateway sends the upgrade data corresponding to the type of the to-be-upgraded node to a corresponding to-be-upgraded node to complete the program upgrade for the corresponding to-be-upgraded node.

In other words, after obtaining the to-be-upgraded file, the processor 64 may parse the to-be-upgraded file, detect the type of the to-be-upgraded node in the to-be-upgraded file, split the to-be-upgraded file, and obtain, from the to-be-upgraded file, the upgrade data corresponding to the type of the to-be-upgraded node. Finally, the transmitter 62 sends the obtained upgrade data to the communications gateway in the BMS, so that the communications gateway sends the upgrade data to the corresponding to-be-upgraded node to complete the program upgrade for the corresponding to-be-upgraded node.

In the EMS, when the current operating status of the energy storage system allows a program upgrade after the processor 64 obtains the to-be-upgraded file of the energy storage system, the processor 64 controls, by using the PCS, the energy storage system to disconnect from high voltage, and detects the status of high voltage connection of the energy storage system by using the BMS. After the receiver 61 receives the notification sent by the BMS indicating completion of disconnecting the energy storage system from the high voltage, the transmitter 62 sends the to-be-upgraded file to the BMS, so that the BMS performs the program upgrade according to the to-be-upgraded file. In this way, the program upgrade can be performed for the energy storage system remotely, the upgrade operation of the energy storage system is simplified, and costs of human resources and time are saved. In addition, the same line can be shared by upgrade and communication, thereby further saving hardware costs.

Figure 7:
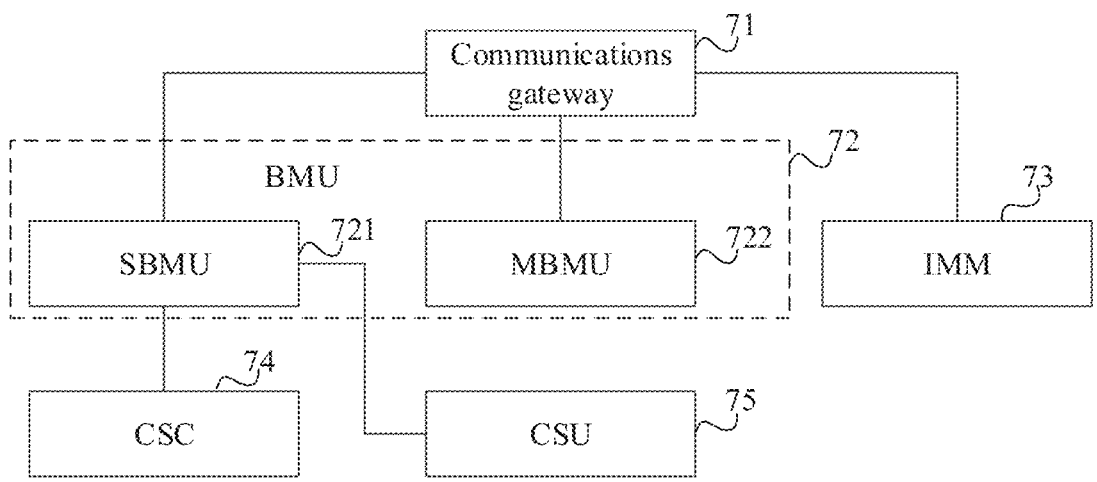
FIG. 7 is a schematic structural diagram of an embodiment of a BMS according to this application.

FIG. 7 is a schematic structural diagram of an embodiment of a BMS according to this application. The BMS provided in this embodiment is disposed in an energy storage system. As shown in FIG. 7, the BMS includes a communications gateway 71.

The communications gateway 71 is configured to: receive a to-be-upgraded file sent by the EMS, where the to-be-upgraded file is obtained by the EMS; control, by the EMS by using the PCS, the energy storage system to disconnect from high voltage when a current operating status of the energy storage system allows a program upgrade, and detect status of high voltage connection of the energy storage system by using the BMS; send the to-be-upgraded file to the BMS after receiving a notification sent by the BMS indicating completion of disconnecting the energy storage system from the high voltage; detect a type of a to-be-upgraded node in the to-be-upgraded file; and perform the program upgrade on the to-be-upgraded node according to the type of the to-be-upgraded node by using the to-be-upgraded file.

Specifically, after the communications gateway 71 receives the to-be-upgraded file sent by the EMS, the communications gateway 71 may perform one or more of the following operations on the received to-be-upgraded file: decryption, decompression, verification, and storage.

The verification may include an integrity check. Nevertheless, this embodiment is not limited to the integrity check. The verification may also include other types of checks, such as a legality check. This embodiment does not limit the type of the verification.

After performing the above operations on the received to-be-upgraded file, the communications gateway 71 may detect the type of the to-be-upgraded node in the to-be-upgraded file.

In this embodiment, the type of the to-be-upgraded node is indicated in the to-be-upgraded file. The upgrade mode varies with the type of the to-be-upgraded node.

In a specific implementation, the communications gateway 71 is specifically configured to: set an update flag bit in a non-volatile memory of the communications gateway when the type of the to-be-upgraded node is the communications gateway; after an upgrade request included in the to-be-upgraded file to upgrade the communications gateway is detected, copy upgrade data in the to-be-upgraded file to a designated area of the communications gateway, such as an APP running area in the communications gateway; verify the upgrade data in the designated area after completion of copying the upgrade data; and run the upgrade data in the designated area of the communications gateway after verifying the upgrade data in the designated area, so as to complete the program upgrade of the communications gateway.

Specifically, after the communications gateway 71 detects the type of the to-be-upgraded node in the to-be-upgraded file, if the type of the to-be-upgraded node is the communications gateway itself, the communications gateway 71 may set an update flag bit in an NVM, and then start a program upgrade process (that is, jump to run a boot program). The boot program detects that an upgrade request exists currently, and therefore, copies the upgrade data, which is stored in a backup area of the communications gateway, to a designated area (such as an APP running area) of the communications gateway in an established file format. The boot program verifies the data in the designated area after completion of copying the upgrade data. After the upgrade data passes the verification, the resetting application is verified valid, and the upgrade data is run in the designated area of the communications gateway 71, so as to complete the program upgrade for the communications gateway.

In another implementation, the BMS further includes a battery management unit 72 and/or an IMM 73. The battery management unit in the BMS may include an SBMU 721 and an MBMU 722. In this case, the communications gateway 71 is further configured to: send a program upgrade notification to the battery management unit 72 and/or the IMM 73; and obtain upgrade data from the to-be-upgraded file after a program upgrade process of the battery management unit 72 and/or the IMM 73 is started, and send the upgrade data to the battery management unit 72 and/or the IMM 73.

The battery management unit 72 and/or IMM 73 is configured to: verify the upgrade data and store the upgrade data into a designated area in the battery management unit 72 and/or the IMM 73 after the upgrade data passes the verification, so as to complete the program upgrade for the battery management unit 72 and/or the IMM 73.

Specifically, if the communications gateway 71 detects that the type of the to-be-upgraded node is SBMU 721, MBMU 722, or IMM 73, firstly the communications gateway 71 instructs the SBMU 721, MBMU 722, or IMM 73 to upgrade the program, and the SBMU 721, MBMU 722, or IMM 73 jumps to run a boot program to start a program upgrade process. Secondly, the communications gateway 71 may directly send the upgrade data, which is obtained from the to-be-upgraded file, to the SBMU 721, MBMU 722, or IMM 73 according to an established upgrade policy and in an established communications format. The boot program of the SBMU 721, MBMU 722, or IMM 73 verifies the received upgrade data and, after the upgrade data passes the verification, stores the upgrade data into a designated area to complete the program upgrade for the SBMU 721, MBMU 722, or IMM 73.

In still another implementation, the BMS may further include a CSC 74 and/or a CSU 75. In this case, the communications gateway 71 is further configured to: send a program upgrade notification to the CSC 74 and/or the CSU 75; and obtain upgrade data from the to-be-upgraded file after a program upgrade process of the CSC 74 and/or the CSU 75 is started, and send the upgrade data to the CSC 74 and/or the CSU 75 through the battery management unit 72.

The CSC 74 and/or the CSU 75 is configured to: verify the upgrade data and store the upgrade data into a designated area in the CSC 74 and/or the CSU 75 after the upgrade data passes the verification, so as to complete the program upgrade for the CSC 74 and/or the CSU 75.

Specifically, if the communications gateway 71 detects that the type of the to-be-upgraded node is CSC 74 or CSU 75, firstly the communications gateway 71 instructs the CSC 74 or CSU 75 to upgrade the program, and the CSC 74 or CSU 75 jumps to run a boot program to start a program upgrade process. Secondly, the communications gateway 71 sends the upgrade data, which is obtained from the to-be-upgraded file, to the SBMU 721 according to an established upgrade policy and in an established communications format. The SBMU 721 forwards the upgrade data to the CSC 74 or CSU 75. The boot program of the CSC 74 or CSU 75 verifies the received upgrade data and, after the upgrade data passes the verification, stores the upgrade data into a designated area in the CSC 74 or CSU 75 to complete the program upgrade for the CSC 74 or CSU 75.

Further, if any error occurs in the program upgrade process of the SBMU 721, MBMU 722, IMM 73, CSC 74, and/or CSU 75, the communications gateway 71 is further configured to correct the error according to an error type of the error, and restart to perform a new process of program upgrade if the error fails to be corrected and, when a cumulative quantity of restarts of the same upgrade data exceeds a preset threshold, stop the program upgrade process and report a program upgrade failure notification to the EMS.

Specifically, for the error that occurs in the program upgrade process, the communications gateway 71 may correct the error by means of packet retransmission.

The preset threshold of the quantity of restarts may be set according to system performance and/or implementation requirements and the like in a specific implementation. This embodiment does not limit the threshold. For example, the threshold may be 5.

In still another implementation of this embodiment, the type of the to-be-upgraded node may include a battery management unit 72, an IMM 73, and/or a CSU 75 in the BMS. The to-be-upgraded file includes a preset threshold and/or a preset parameter of the BMS. In this case, the communications gateway 71 is specifically configured to parse the to-be-upgraded file to obtain the threshold and/or parameter of the BMS included in the to-be-upgraded file; and send the threshold and/or parameter of the BMS to a corresponding to-be-upgraded node in the BMS when it is detected that the current operating status of the BMS allows upgrading.

For a specific process of updating the threshold and/or parameter of the BMS remotely, refer to the relevant description in the embodiment shown in FIG. 5 according to this application, and details are omitted here.

Figure 9:
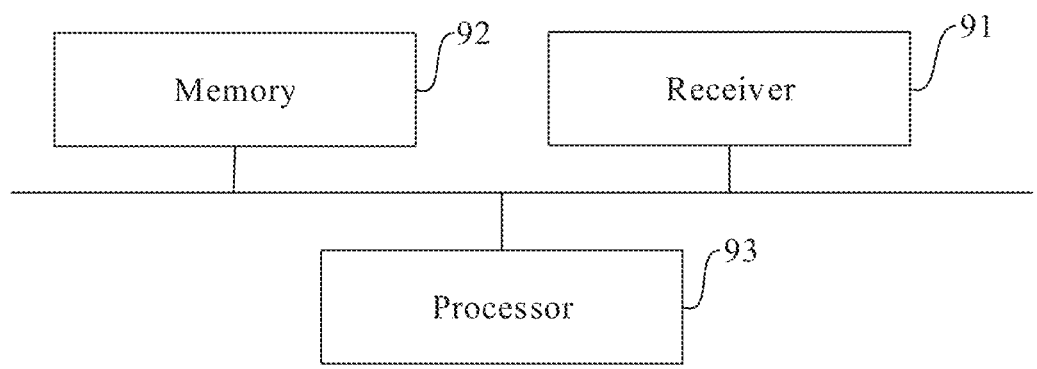
FIG. 9 is a schematic structural diagram of an embodiment of a communications gateway according to this application.

In a specific implementation, the communications gateway 71 in this embodiment may be the communications gateway provided in the embodiment shown in FIG. 9 according to this application.

Figure 8:
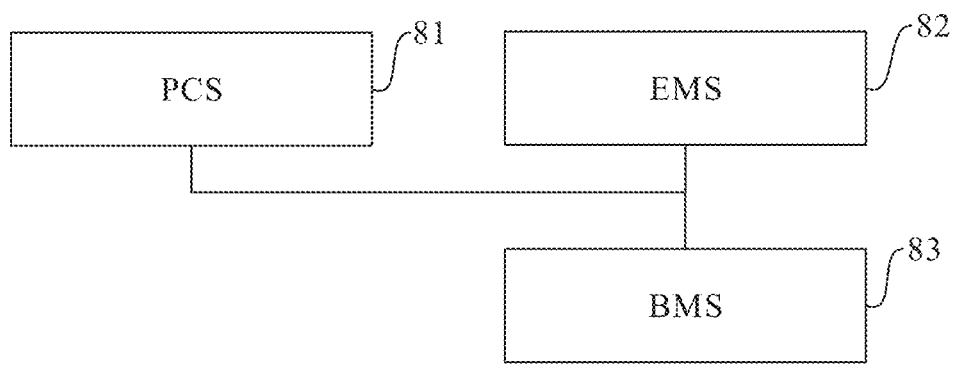
FIG. 8 is a schematic structural diagram of an embodiment of an energy storage system according to this application.

FIG. 8 is a schematic structural diagram of an embodiment of an energy storage system according to this application. As shown in FIG. 8, the energy storage system may include a PCS 81, an EMS 82, and a BMS 83. The EMS 82 is connected to the PCS 81, the PCS 81 is connected to the BMS 83, and the EMS 82 is connected to the BMS 83.

The EMS 82 may be the EMS provided in the embodiment shown in FIG. 6 according to this application, and the BMS 83 may be the BMS provided in the embodiment shown in FIG. 7 according to this application.

FIG. 9 is a schematic structural diagram of an embodiment of a communications gateway according to this application. The communications gateway is disposed in the BMS. As shown in FIG. 9, the communications gateway may include a receiver 91, a memory 92, a processor 93, and a computer program stored in the memory 92 and adaptable for running on the processor 93. When executing the computer program, the processor 93 can implement the method provided in the embodiment shown in FIG. 5 for upgrading an energy storage system remotely according to this application.

An embodiment of this application further provides a remote upgrade system for an energy storage system, including: a client, a server, and the energy storage system provided in the embodiment shown in FIG. 8. In a specific implementation, the remote upgrade system for an energy storage system may adopt the architecture shown in FIG. 1, and details are omitted here.

An embodiment of this application further provides a non-transitory computer-readable storage medium on which a computer program is stored. When executed by a processor, the computer program implements the method provided in the embodiment shown in FIG. 4 or FIG. 5 for upgrading an energy storage system remotely according to this application.

The non-transitory computer-readable storage medium may be any combination of one or more computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM) or flash memory, an optical fiber, a portable compact disc read-only memory (CD-ROM), an optical storage device, a magnetic storage device, or any suitable combination thereof. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, radio frequency (RF), or any suitable combination thereof.

Computer program code for carrying out operations under this application may be written in any combination of one or more programming languages, including an object oriented programming language such as Java, Smalltalk, C++ or the like and conventional procedural programming languages, such as the "C" programming language or similar programming languages. The program code may be executed entirely on the user's computer, partly on the user's computer, as a stand-alone software package, partly on the user's computer and partly on a remote computer, or entirely on a remote computer or server. In a scenario involving a remote computer, the remote computer may be connected to the user's computer through any type of network, including a local area network (LAN) or a wide area network (WAN), or may be connected to an external computer (for example, through the Internet using an Internet Service Provider).

Reference throughout this specification to "one embodiment", "some embodiments", "one or more embodiments", "an embodiment", "specific example", "some examples", and the like means that a particular feature, structure, material, or characteristic described in connection with the embodiment or example is included in at least one embodiment or example in this application. In this embodiment, the appearances of such terms are not necessarily referring to the same embodiment or example. Furthermore, the particular features, structures, materials, or characteristics may be combined in any suitable manner in one or more embodiments. In addition, a person skilled in the art can integrate or combine different embodiments or examples as well as the features of different embodiments or examples described herein to the extent that they do not contradict each other.

In addition, the terms "first" and "second" are used for descriptive purposes only and are not to be construed as indicating or implying a relative importance or implicitly indicating the number of technical features indicated. Therefore, the features preceded by "first" or "second" may explicitly or implicitly include at least one of the features. In the description of this application, unless otherwise expressly specified, "a plurality of" means at least two, for example, two, three, or more.

Any process or method illustrated in a flowchart or otherwise described herein may be understood as representing a module, segment, or portion of code that includes one or more executable instructions for implementing the steps of the specified logical function(s) or process(es). In addition, the scope of an exemplary implementation of this application shall include alternative implementations. The steps may occur out of the order illustrated or discussed herein. For example, the functions described or illustrated in succession may, in fact, be executed substantially concurrently, or the functions may sometimes be executed in the reverse order, depending upon the functionality involved, which is understandable to those skilled in the technical field to which the embodiments of this application relate.

Depending on the context, the word "if" as used herein may be interpreted as "at the time of" or "when" or "in response to determination" or "in response to detection." Similarly, depending on the context, the phrase "if determined" or "if detected (conditions or events stated)" may be interpreted as "when determined" or "in response to determination" or "when detected (conditions or events stated)" or "in response to detection (conditions or events stated)."

It needs to be noted that the terminals referred to in the embodiments of this application may include, but without limitation, a personal computer (PC), a personal digital assistant (PDA), a wireless handheld device, a tablet computer, a mobile phone, an MP3 player, and an MP4 player.

In the several embodiments provided in this application, it is understandable that the disclosed system, apparatus, and method may be implemented in other manners. For example, the apparatus embodiment described above is merely exemplary. For example, the unit division is merely division with respect to logical functions, and in actual implementations, the units may be divided in other manners. For example, a plurality of units or components may be combined or integrated into another system, or some features may be ignored or not implemented. In addition, the displayed or discussed mutual couplings or direct couplings or communication connections may be implemented through some interfaces. The indirect couplings or communication connections between the apparatuses or units may be implemented in electronic, mechanical or other forms.

In addition, function units in the embodiments of this application may be integrated into one processing unit, or each of the units may exist alone physically, or two or more units may be integrated into one unit. The integrated unit may be implemented in the form of hardware, or in the form of both hardware and a software function unit.

The integrated unit implemented in the form of a software function unit may be stored in a computer-readable storage medium. The software function unit is stored in a storage medium including a plurality of instructions that cause a computer device (such as a personal computer, a server, or a network device) or a processor to implement a part of steps of the method described in each embodiment of this application. The storage medium includes any medium that can store program code, for example, a USB flash disk, a removable hard disk, a ROM, a RAM, a magnetic disk, or an optical disk.

The foregoing descriptions are merely exemplary embodiments of this application, but are not intended to limit this application. Any modifications, equivalent substitutions, and improvements made within the principles of this application shall fall within the protection scope of this application.

What is claimed is:

1. A method for upgrading an energy storage system, applied to a computing device, wherein the energy storage system comprises an energy management system, a battery management system, and a power conversion system, and the method comprising:
    obtaining, by a communications gateway in the battery management system, a to-be-upgraded file of the energy storage system;
    controlling, by the power conversion system, the energy storage system to disconnect from high voltage when a current operating status of the energy storage system allows a program upgrade;
    detecting, by the battery management system, status of the high voltage connection of the energy storage system;
    receiving a notification sent by the battery management system indicating completion of disconnecting the energy storage system from the high voltage;
    detecting a type of a to-be-upgraded node in the to-be-upgraded file;
    sending the to-be-upgraded file to the battery management system, wherein the battery management system performs the program upgrade to the to-be-upgraded node according to the type of the to-be-upgraded node by using the to-be-upgraded file.

2. The method according to claim 1, wherein the obtaining a to-be-upgraded file of the energy storage system comprises:
    receiving the to-be-upgraded file of the energy storage system sent by a server, wherein the server receives the to-be-upgraded file from a client, and the to-be-upgraded file is encrypted by the client after the client performs format adjustment; or
    querying the server for a version of the to-be-upgraded file in the server at a preset time or periodically, and obtaining an updated version of the to-be-upgraded file from the server if it is detected that the version of the to-be-upgraded file in the server is an updated version; or
    obtaining the to-be-upgraded file of the energy storage system from a memory connected to the energy management system.

3. The method according to claim 1, wherein the sending the to-be-upgraded file to the battery management system comprises:
    obtaining, from the to-be-upgraded file, upgrade data corresponding to the type of the to-be-upgraded node; and
    sending the upgrade data corresponding to the type of the to-be-upgraded node to the communications gateway in the battery management system, wherein the communications gateway sends the upgrade data corresponding to the type of the to-be-upgraded node to a corresponding to-be-upgraded node to complete the program upgrade for the corresponding to-be-upgraded node.

4. The method according to claim 1, wherein
the battery management system performs the program upgrade on the to-be-upgraded node according to the type of the to-be-upgraded node by using the to-be-upgraded file comprises:
    setting an update flag bit in a non-volatile memory of the communications gateway;
    copying upgrade data in the to-be-upgraded file to a designated area of the communications gateway after an upgrade request comprised in the to-be-upgraded file to upgrade the communications gateway is detected;
    verifying the upgrade data in the designated area after completion of copying the upgrade data; and
    executing the upgrade data in the designated area of the communications gateway after verifying the upgrade data in the designated area, so as to complete the program upgrade for the communications gateway.

5. The method according to claim 1, wherein the type of the to-be-upgraded node comprises a battery management unit and/or an insulation monitoring module in the battery management system; and
    the battery management system performs the program upgrade on the to-be-upgraded node according to the type of the to-be-upgraded node by using the to-be-upgraded file comprises:
    sending a program upgrade notification to the battery management unit and/or the insulation monitoring module;
    obtaining upgrade data from the to-be-upgraded file after a program upgrade process of the battery management unit and/or the insulation monitoring module is started; and
    sending the upgrade data to the battery management unit and/or the insulation monitoring module, wherein the battery management unit and/or the insulation monitoring module verifies the upgrade data and stores the upgrade data into a designated area in the battery management unit and/or the insulation monitoring module after the upgrade data passes the verification, so as to complete the program upgrade for the battery management unit and/or the insulation monitoring module.

6. The method according to claim 1, wherein the type of the to-be-upgraded node comprises a cell supervision circuit and/or a current sampling unit in the battery management system; and
    the battery management system performs the program upgrade on the to-be-upgraded node according to the type of the to-be-upgraded node by using the to-be-upgraded file comprises:
    sending a program upgrade notification to the cell supervision circuit and/or the current sampling unit;
    obtaining upgrade data from the to-be-upgraded file after a program upgrade process of the cell supervision circuit and/or the current sampling unit is started; and
    sending the upgrade data to the cell supervision circuit and/or the current sampling unit through a battery management unit, wherein the cell supervision circuit and/or the current sampling unit verifies the upgrade data and stores the upgrade data into a designated area in the cell supervision circuit and/or the current sampling unit after the upgrade data passes the verification, so as to complete the program upgrade for the cell supervision circuit and/or the current sampling unit.

7. The method according to claim 5, further comprising:
correcting, by the communications gateway, an error according to an error type of the error if the error occurs in the program upgrade process; and
restarting to perform a new process of program upgrade if the error fails to be corrected, stopping the program upgrade process when a cumulative quantity of restarts of the same upgrade data exceeds a preset threshold, and reporting a program upgrade failure notification to the energy management system.

8. The method according to claim 1, wherein the type of the to-be-upgraded node comprises a battery management unit, an insulation monitoring module, and/or a current sampling unit in the battery management system; and the to-be-upgraded file comprises a preset threshold and/or a preset parameter of the battery management system; and
the battery management system performs the program upgrade on the to-be-upgraded node according to the type of the to-be-upgraded node by using the to-be-upgraded file comprises:
parsing the to-be-upgraded file to obtain the threshold and/or parameter of the battery management system comprised in the to-be-upgraded file; and
sending the threshold and/or parameter of the battery management system to a corresponding to-be-upgraded node in the battery management system when it is detected that the current operating status of the battery management system allows upgrading.

9. An energy management system, disposed in an energy storage system, wherein the energy management system comprises a receiver, a transmitter, a memory, a processor, and a plurality of computer programs stored in the memory that, when executed by the processor, cause the processor to:
obtain a to-be-upgraded file of the energy storage system;
control, by using a power conversion system in the energy storage system, the energy storage system to disconnect from high voltage when a current operating status of the energy storage system allows a program upgrade;
detect, by using a battery management system in the energy storage system, status of high voltage connection of the energy storage system;
receive, by using the receiver, a notification sent by the battery management system indicating completion of disconnecting the energy storage system from the high voltage;
send, by using the transmitter, the to-be-upgraded file to the battery management system, wherein the battery management system performs the program upgrade to the energy storage system according to the to-be-upgraded file;
detect by using a communications gateway in the battery management system, a type of a to-be-upgraded node in the to-be-upgraded file; and
perform, by using the battery management system, the program upgrade on the to-be-upgraded node according to the type of the to-be-upgraded node by using the to-be-upgraded file.

10. The energy management system according to claim 9, wherein the processor is configured to:
receive, by using the receiver, the to-be-upgraded file of the energy storage system sent by a server, wherein the server receives the to-be-upgraded file from a client, and the to-be-upgraded file is encrypted by the client after the client performs format adjustment; or
query the server for a version of the to-be-upgraded file in the server at a preset time or periodically, and obtain an updated version of the to-be-upgraded file from the server if it is detected that the version of the to-be-upgraded file in the server is an updated version; or
obtain the to-be-upgraded file of the energy storage system from a memory connected to the energy management system.

11. The energy management system according to claim 9, wherein the processor is further configured to:
obtain, from the to-be-upgraded file, upgrade data corresponding to the type of the to-be-upgraded node; and
send, by using the transmitter, the upgrade data corresponding to the type of the to-be-upgraded node to the communications gateway in the battery management system, wherein the communications gateway sends the upgrade data corresponding to the type of the to-be-upgraded node to a corresponding to-be-upgraded node to complete the program upgrade for the corresponding to-be-upgraded node.

12. The energy management system according to claim 9, wherein the communications gateway is configured to:
set an update flag bit in a non-volatile memory of the communications gateway when the type of the to-be-upgraded node is the communications gateway;
copy upgrade data in the to-be-upgraded file to a designated area of the communications gateway after an upgrade request comprised in the to-be-upgraded file to upgrade the communications gateway is detected;
verify the upgrade data in the designated area after completion of copying the upgrade data; and
execute the upgrade data in the designated area of the communications gateway after verifying the upgrade data in the designated area, so as to complete the program upgrade for the communications gateway.

13. The energy management system according to claim 9, further comprising a battery management unit and/or an insulation monitoring module; wherein the communications gateway is configured to:
send a program upgrade notification to the battery management unit and/or the insulation monitoring module;
obtain upgrade data from the to-be-upgraded file after a program upgrade process of the battery management unit and/or the insulation monitoring module is started; and
send the upgrade data to the battery management unit and/or the insulation monitoring module, wherein the battery management unit and/or insulation monitoring module is configured to: verify the upgrade data and store the upgrade data into a designated area in the battery management unit and/or the insulation monitoring module after the upgrade data passes the verification, so as to complete the program upgrade for the battery management unit and/or the insulation monitoring module.

14. The energy management system according to claim 9, further comprising a cell supervision circuit and/or a current sampling unit, wherein the communications gateway is configured to:
send a program upgrade notification to the cell supervision circuit and/or the current sampling unit;
obtain upgrade data from the to-be-upgraded file after a program upgrade process of the cell supervision circuit and/or the current sampling unit is started; and
send the upgrade data to the cell supervision circuit and/or the current sampling unit through a battery management unit, wherein the cell supervision circuit and/or current sampling unit is configured to: verify the upgrade data and store the upgrade data into a designated area in the cell supervision circuit and/or the current sampling unit after the upgrade data passes the verification, so as to complete the program upgrade for the cell supervision circuit and/or the current sampling unit.

15. The energy management system according to claim 13, wherein the communications gateway is configured to:
correct an error according to an error type of the error when the error occurs in the program upgrade process; and
restart to perform a new process of program upgrade if the error fails to be corrected, stop the program upgrade process when a cumulative quantity of restarts of the same upgrade data exceeds a preset threshold, and report a program upgrade failure notification to the energy management system.

16. The energy management system according to claim 9, wherein the type of the to-be-upgraded node comprises a battery management unit, an insulation monitoring module, and/or a current sampling unit in the battery management system; and the to-be-upgraded file comprises a preset threshold and/or a preset parameter of the battery management system; and the communications gateway is configured to:
parse the to-be-upgraded file to obtain the threshold and/or parameter of the battery management system comprised in the to-be-upgraded file; and
send the threshold and/or parameter of the battery management system to a corresponding to-be-upgraded node in the battery management system when it is detected that the current operating status of the battery management system allows upgrading.

* * * * *